Oct. 17, 1961 M. HOBERMAN 3,005,156
AUTOMATIC RANGE SELECTOR
Filed Jan. 18, 1956 2 Sheets-Sheet 2
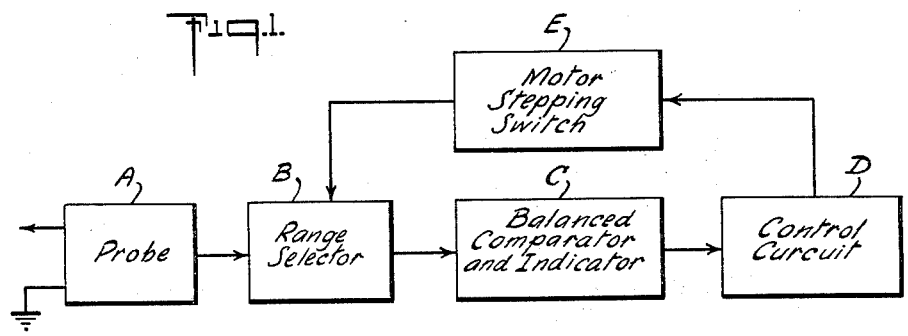
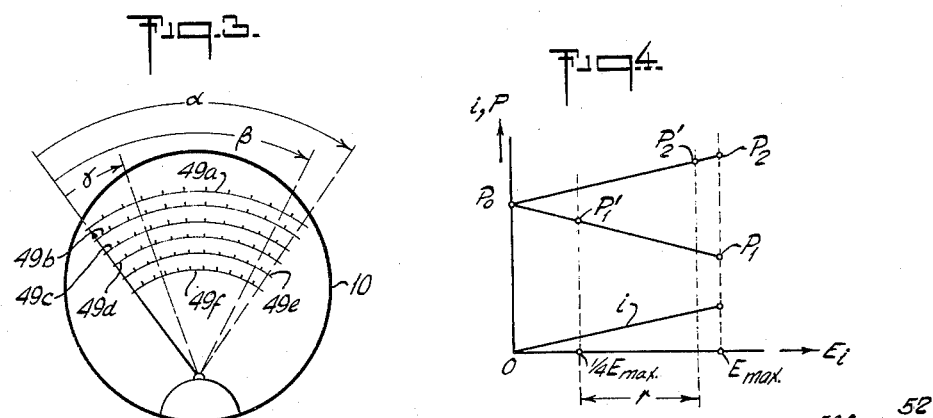
INVENTOR
MAX HOBERMAN
BY
ATTORNEY

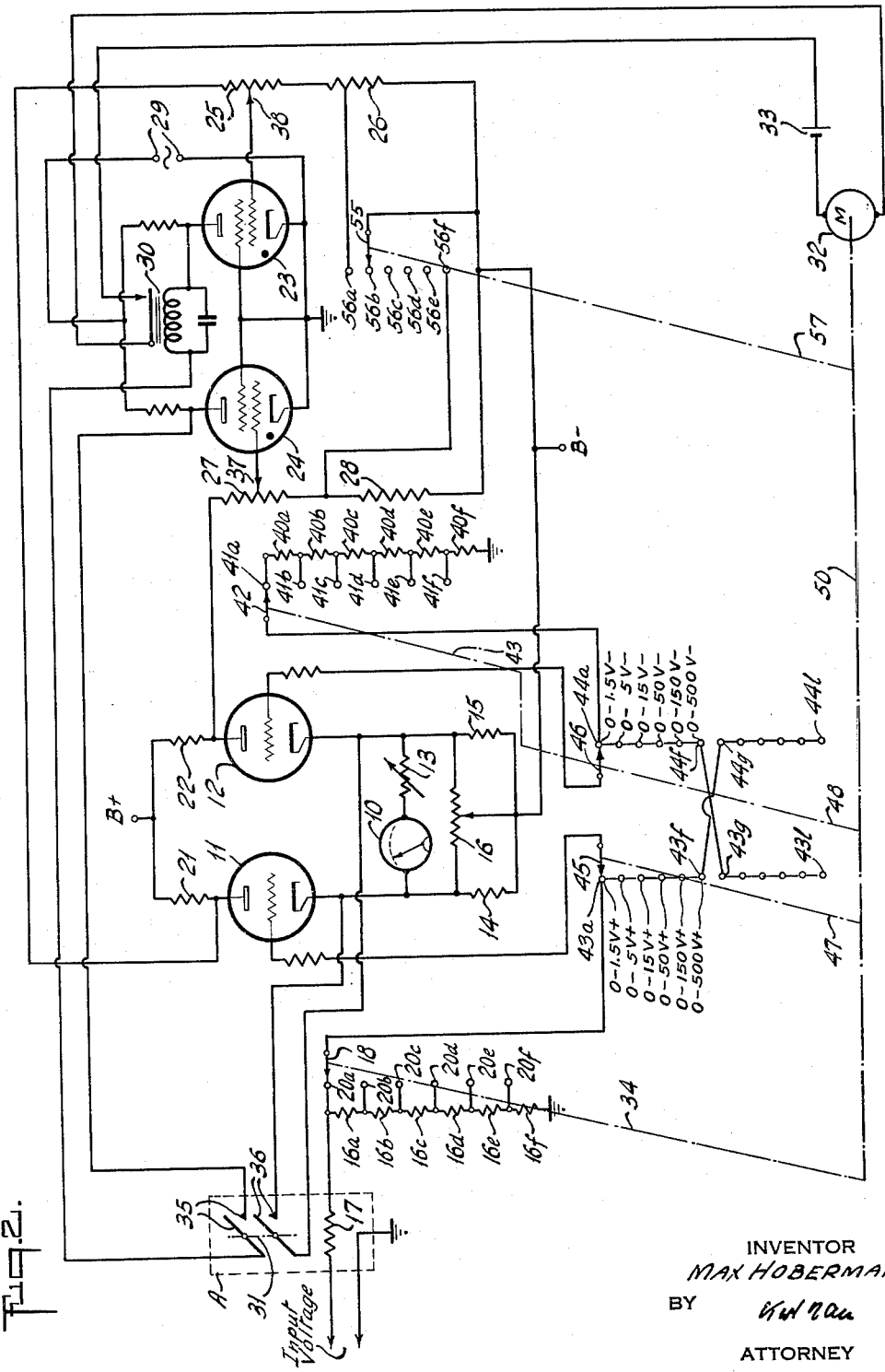

United States Patent Office 3,005,156
Patented Oct. 17, 1961

3,005,156
AUTOMATIC RANGE SELECTOR
Max Hoberman, Fair Lawn, N.J., assignor to Bergen Laboratories Inc., Paterson, N.J., a corporation of New Jersey
Filed Jan. 18, 1956, Ser. No. 560,032
4 Claims. (Cl. 324—115)

This application is a continuation-in-part of application Serial No. 497,077, filed March 28, 1955 entitled Automatic Range Selector, now abandoned.

The present invention relates to means for and a method of automatic range selection for use in connection with electrical measuring and/or translating systems, more particularly to range selectors which may be employed to select one or more of a plurality of random-valued conditions, the conditions selected being determined by reason of their falling within preset or predetermined limits of any of a number of plural ranges of the magnitude to be measured or translated.

A preferred practical embodiment of the invention relates to automatic selection of one of a multiplicity of meter indicating scales or ranges in a multi-range electric meter or instrument. In such case, the object is that the range selected of the value being measured, such as voltage, resistance, etc. falls within a desired predetermined portion or partial range of the plural indicating scales or ranges of the instrument.

In its broader aspects, the invention utilizes a combination of digital-analogue servomechanism. Thus, in the example of a measuring instrument as shown by the drawings and described in the following, there is a quantization of the unknown electric voltage or resistance amounting to a rough or course translation or indication plus a remainder representing the exact or fine measurement of the quantity concerned such as voltage, resistance, etc. The quantization of discrete or incremental steps constituting the digital portion is effected by the automatic range selector switch or servomechanism, while the remainder or fine indication which is displayed on the instrument constitutes the analogue portion.

The method of and system for automatic range or scale selection according to the invention, while especially useful for and applicable to plural-range electric measuring instruments, has general use and application in translating any magnitude or quantity convertible into proportionate electric current or voltage values, where a translation or control with respect to a multiplicity of discrete incremental values or ranges is sufficient or desirable, with or without fine control or translation within the multiple or incremental range selected by the automatic selector.

Multi-range electric meters at present being used for measuring direct current voltage, alternating current voltage, resistance, etc. do not have the ability to automatically select a suitable scale on which a reading may be made under optimum reading conditions of the voltage, resistance, etc. being measured. In general, the upper or higher portion of the meter scale is the most accurate on which to display a reading and in order to place the reading on that portion of the scale, it is often necessary to move the range selector switch manually from a random starting position, after observing the initial reading on the meter scale. In order to protect the meter or instrument from burning out and to avoid other drawbacks and defects, it is advisable to commence the reading operation of an unknown voltage, resistance, etc. with the range switch set on the highest scale of the instrument and to progressively proceed in the direction of descending values to lower scales until a favorable range has been found. Many instrument users will, however, use the first scale they reach which gives a readable indication even though another scale may be more accurate by providing a greater meter deflection for the particular voltage, resistance, etc. being measured.

Accordingly, making the scale selection automatic as proposed by the present invention and thereby insuring utilization of the most favorable and accurate scale for the particular voltage, resistance, etc. being measured will increase the utility and accuracy of the measurement and reduce the possibility of errors and other drawbacks inherent in the previous manual selecting methods, while at the same time increasing the speed or time required for performing a measuring operation. Furthermore, in the case of an automatic range selector according to the invention, the scale selection may be made in the direction of ascending values or from lower to higher meter scales or ranges, resulting in a maximum meter deflection and most accurate reading when the selector reaches the first scale where the indicator needle falls within the upper or most favorable portion of the indicating scale or range. Such a method of range selection is not possible with present instruments, since the indicating needle would be thrown against the indicator stop whenever a voltage, resistance, etc. causing greater than full scale deflection of the meter is applied to the input of the instrument.

Accordingly, a principal object of the invention is the provision of a plural-range electric meter or translating device which automatically selects a proper incremental value scale range for reading or translating a voltage, resistance, etc. applied to the input of the device.

Another object of the invention is the provision of a plural-range electric meter or translating device which automatically selects the most favorable or accurate scale range or incremental value for indicating and/or translating a varying voltage or other input magnitude.

Still another object of the invention is the provision of a system for automatically translating an input voltage, resistance, etc. by a relatively course incremental control as well as by a fine control within the incremental range selected wherein furthermore, the fine control is disabled during the course control or range selection and vice versa.

Another object is the provision of a range selector of the type described which automatically selects a scale or incremental measuring range insuring maximum sensitivity of indication of the voltage, resistance, etc. within the range selected.

Another object is the provision of an automatic range selector designed to respond to both positive and negative input magnitudes, such as voltage, by the provision of automatic polarity reversing means cooperating with the range selector.

A more specific object of the invention is the provision of an automatic range selector for plural-range electric measuring instruments, in particular, electron tube volt meters, which operates by selecting a proper indicating scale range such that the indication falls within a predetermined upper portion of the range or scale selected, further automatic means being provided to arrest the selector upon reaching the upper and lower ends, respectively, of the indicating portions of the highest and lowest scales or ranges of the instrument.

The above and further objects as well as novel aspects of the invention will be better understood from the following detailed description of a practical embodiment taken in reference to the accompanying drawings, forming part of this specification and wherein:

FIG. 1 is a basic block diagram showing the general layout of an automatic plural-range indicating and/or translating system according to the invention;

FIG. 2 shows a detailed circuit diagram of an automatic range selecting system for measuring electric voltage, resistance, etc. constructed in accordance with the principles of the invention;

FIG. 3 is a schematic diagram of the indicator of FIG. 2;

FIG. 4 is a graph explanatory of the function and operation of the invention;

FIG. 5 is a schematic perspective view of a structural embodiment of the automatic range selector shown schematically in FIG. 2; and FIG. 6 is a diagram illustrating the use of the invention as a step-servo or control device.

Like reference characters denote like parts throughout the different views of the drawings.

While the invention is described in the following with specific reference to a plural-range electric measuring instrument, in particular, an electron tube volt meter or ohmmeter, other uses and applications of the invention as a simple step-servo or control device, will become obvious to those skilled in the art from the basic and underlying principle thereof.

Referring more particularly to FIG. 1, there is shown an input circuit or probe A for applying a voltage, resistance, etc., to be measured to the input of the instrument, said probe including switching means for disabling the meter or indicator embodied in the balanced comparator C during the operation of the automatic range selector B which serves to select a proper measuring or indicating range by the action of a control circuit D and motor or automatic stepping switch E.

FIG. 2 shows, by way of example, a more detailed circuit diagram of an automatic range switching volt meter constructed on the general principle according to FIG. 1.

The D'Arsonval type or other current indicator 10 is connected between the cathodes of a pair of balanced triode electron tubes 11 and 12 connected in the manner of a conventional vacuum tube volt meter and further acting as a comparator or input stage to provide control signals or potentials for the automatic range selector to be described presently. Connected in series with the meter 10 is a calibrating resistance 13 provided for the purpose of adjusting the deflection of the meter to correspond to a desired or known input voltage. Items 14 and 15 are a pair of cathode load resistors for the tubes 11 and 12, part of the load being made variable by the provision of a further resistor 16 connected between the cathodes of the tubes and having an adjustable center tap connected to the lower ends of the load resistors 14 and 15 or the negative terminal of the anode voltage supply source or B— line of the circuit.

Adjustment of the center tap of resistor 16 makes it possible to establish a zero meter deflection if no input signal is applied to the instrument and to rezero the meter after the tubes become aged or the line voltage and other operating conditions vary during the life of the instrument. The terminals of the probe A have applied thereto the input voltage to be measured, such as by connecting one side of this voltage to ground or the zero reference point of the instrument as shown and connecting the other side of the input voltage, by way of a probe capacitance isolating resistor 17, to the series-connected potentiometric or multiplier resistors 16a–16f, providing six measuring ranges in the example shown. The input voltage being divided in a known manner by the action of the multiplier resistors 16a–16f is applied to the grid of one of the balanced triodes, that is, triode 11 in the position shown in FIG. 1, through an adjustable switch contact or arm 18 of the range selector which cooperates with fixed contacts 20a–20f connected to the multiplier resistors 16a–16f in the manner shown and readily understood.

The voltage to be measured impressed upon the grid of one of the tubes 11 and 12 causes a change of the current between the cathodes and through the meter 10 by unbalancing the anode currents through the tubes, that is, increasing the current through one tube and decreasing the current through the other tube, in such a manner as to cause a deflection of the meter 10 in proportion to the applied input voltage. By calibrating the meter directly in voltage values, the voltage being measured can thus be read directly upon an appropriate scale of the instrument.

The unbalanced anode currents further cause a change of the anode potentials of the tubes by the action of anode load resistors 21 and 22 inserted between the anodes and the positive pole of the anode voltage source or B+ line of the circuit. The anode potential changes of the tubes 11 and 12 are impressed upon the grids or control electrodes of a pair of switching tubes shown in the form of thyratrons 23 and 24 by way of series-connected coupling or biasing resistors 25—26 and 27—28, respectively. The thyratrons are A.C.-operated such as from an existing power or house lighting circuit 29, whereby to cause conduction only during the positive half cycles of the anode voltage and to enable an on-off control of the anode currents by application and removal of proper grid control or firing potentials, respectively.

Depending upon the setting of the selector switch 18 and the polarity of the input voltage applied by way of the probe A, the grid of either thyratron 24 or 25 will become more positive as the input voltage increases or decreases, respectively, whereby the pointer of the indicator 10 moves towards a predetermined upper and lower scale limit of the instrument. After a sufficiently positive voltage has been reached corresponding to the upper or lower limit on the meter scale, one of the thyratrons is fired so as to conduct current during the positive half cycles of the operating voltage. Either thyratron 23 or 24 conducting current causes a relay 30 connected between the anodes of the tubes to close, provided the input switch 31 in the probe A has been closed upon application to the probe of an input voltage to be measured to initiate the automatic range selection.

Closing of the relay 30 completes the circuit of a motor 32 energized by a suitable power source, such as a battery 33 shown in the example illustrated. The shaft 50 of the motor or equivalent operating device is coupled to the selector switch arm 18 as indicated schematically by the dot-dash line 34, whereby the arm moves in the same direction and successively engages the preferably circularly arranged contacts 20a–20f of the series multiplier resistors 16a–16f (see FIG. 5). Once started the switch continues to move until a range setting is found where the deflection of the meter 10 is neither too great nor too small and therefore neither the thyratron 23 nor the thyratron 24 is in its conducting condition, thus opening the relay 30. When this occurs the motor 32 becomes deenergized and the appropriate measuring range or scale has been found as a result of the automatic range selection. In place of a motor for operating the selector switch, a stepping solenoid switch or the like may be used for controlling the range selector.

In operation, an input voltage to be measured is applied to the probe A in the manner described and the switch 31, such as a push-button or the like, on the probe is depressed, thus closing the circuit for the relay 30 through switch contacts 35. Simultaneously switch contacts 36 of the probe are closed, whereby to directly connect or short-circuit the cathodes of the balancing tubes 11 and 12 to disable the meter 10 during the range selecting operation. This short-circuit prevents the meter from being deflected during the automatic range selection, thus preventing damage to or burning out of the meter. Furthermore, the direct connection of the cathodes of tubes 11 and 12 provides a coupling between the tubes, whereby to cause oppositely phased anode potential changes for controlling the thyratrons 23 and 24, in the manner described above.

After a proper range or scale has been selected by the automatic range selector, as ascertained by the stopping of the motor 32, push-button 31 on the probe A is released to restore the meter to its operating condition and to indicate the voltage, resistance, etc. being measured on a corresponding scale 49a–49f, FIG. 3, of the instrument, while at the same time interrupting the circuit of the relay 30 and disabling the range selector mechanism.

As pointed out, the input voltage applied to the probe A is impressed upon the grid of one of the balanced triodes 11 and 12 through the selector switch arm 18, the voltage in the position shown in FIG. 2 being applied to the grid of the tube 11. As a result, an increasing positive voltage on this grid causes the anode potential of the tube to decrease and, due to the direct coupling connection between the cathodes of the tubes, this causes the anode potential of tube 12 to increase. The increased anode potential of tube 12 is impressed upon the grid of the upper limit control thyratron 24 through the coupling resistance network or potentiometer 27—28 part of which, that is, resistor 27, in the example shown, is adjustable as shown at 37. The setting of the contact 37 is made such that when a voltage is applied to the probe which would cause greater than full scale deflection of the meter 10, the direct current potential upon the grid of the thyratron 24 causes this tube to fire and to conduct during each positive alternation of the A.C. anode voltage. For any input voltage less than this value, the direct current potential applied to the grid of the thyratron 24 is less than the critical firing potential and thus the tube will not conduct.

If, on the other hand, the positive voltage applied to the input of the probe A decreases, then the direct current potential applied to the grid of the thyratron 24 also decreases, but this decreasing positive voltage applied to the probe now causes the anode potential of the tube 11 to increase. This increased potential on the anode of the tube 11 is applied to the grid of the lower limit control thyratron 23 through the voltage dividers 25—26 part of which, that is, resistor 25 is provided with an adjustable contact 38. The latter is so set that when the input voltage is at a point corresponding to a predetermined fraction, say about one-fourth, of full scale deflection or indicating range of the meter 10, the thyratron 23 is fired and begins to conduct. This again causes closing of the relay 30 followed by energization of the motor 32 and operation of the selector switch 18 until a suitable and proper lower indicating range has been reached and automatically adjusted.

There are thus established two operating limits, that is, an upper limit through the action of the anode potential of the tube 12 controlling the thyratron 24 and a lower limit through the action of the anode potential of the tube 11 controlling the thyratron 23. As a result, an input voltage applied to the probe A which lies within the upper three-quarter portion, according to the example mentioned, of the deflecting range of the meter 10 will cause neither of the thyratrons 23 nor 24 to fire and conduct, but an input voltage causing a deflection in either direction beyond or outside of the upper three-quarter portion of the meter scale causes either thyratron 23 or 24 to fire and conduct and to operate the range selector until a new range has been found where the meter indication again falls within the upper three-quarter range of the indicating scale.

In order to establish full symmetry or balance of the tubes 11 and 12, tube 12 has its grid grounded through a number of series-connected balancing resistors 40a–40f corresponding to the multiplier resistors 16a–16f, respectively, and being connected to contacts 41a–41f cooperating with a further switch arm 42 arranged to move synchronously with the switch arm 18 by mounting upon the motor shaft as indicated at 43. The balancing resistors 40a to 40f serve to equalize the grid currents between the tubes and to maintain an accurate balance, but, for tubes which have no inherent grid current, they may be dispensed with and the arm 42 directly connected to ground.

The operation of the balancing tubes 11 and 12 to energize both the indicator 10 and producing control potentials for the thyratrons or equivalent switching devices will be further understood by reference to FIGS. 3 and 4. FIG. 3 shows diagrammatically the meter 10 having a full scale or indicating range α for the six indicating scales 49a–49f, corresponding to the six measuring ranges of the instrument and an upper and lower limit deflection β and γ, the latter being about one-fourth of the full scale and the former being somewhat less than full scale to insure optimum indicating conditions and sensitivity of the meter.

FIG. 4 is a graph representing the current $i$ through the meter 10 and the potentials P of the anodes of the tubes 10 and 11 as a function of the input voltage E$i$ applied to the instrument. As shown, the current $i$ increases in proportion to the input voltage from zero to a value $E_{max}$, thus enabling the instrument to be directly calibrated in values of applied voltage, in a manner known and readily understood. $P_0$ represents the positive anode potential of tubes 11 and 12 in the balanced condition, that is, for zero input voltage E$i$, both anode potentials being identical in the balance position, provided a proper balance or zero adjustment of the tubes. As the input voltage E$i$ increases from zero to its maximum, the anode potential of tube 12 increases proportionately from $P_0$ to $P_2$, while the anode potential of the tube 11 decreases at the same rate from $P_0$ to a value $P_1$, in the manner shown and readily understood from the above. The grid bias potential of the thyratrons 23 and 24 are so adjusted by the setting of contacts 37 and 38 in relation to the constant negative bias from the B— line, that the thyratron 24 will fire when the anode potential of tube 12 reaches the point $P_2$ or a point slightly as shown at $P'_2$ (corresponding to the upper limit deflection β, FIG. 3) with increasing input voltage or scale deflection of the meter 10, and that, furthermore, the thyratron 23 fires at a point where the anode potential of tube 11 reaches point $P'_1$ (corresponding to the lower limit deflection γ, FIG. 3) with decreasing input potential or scale deflection of the meter 10. As a result, for an input voltage falling within the range or portion $r$ for any of the multiple scales of the instrument, the thyratrons and the range selector will be inactive, while, with the indication reaching the upper or lower scale limits, either of the thyratrons is caused to fire and to operate the range selector until a new range has been found at which the indication falls again within the portion $r$ of the instrument scale.

There is further provided according to the invention automatic polarity selecting means to enable an input voltage to be indicated irrespective of its polarity or sense of connection to the probe terminals. To this end, there is shown in FIG. 2 a polarity reversing switch coupled with the automatic range selector switches 18 and 42 and comprising two sets of contacts 43a–43l and 44a–44l, respectively, that is, each set having twice the number of contacts compared with the multiplier and balancing resistors 16a to 16f and 40a to 40f. Each set of the reversing switch contacts cooperates with a switch arm 45 and 46, respectively. Contacts 43a–43f are all electrically connected together and so are contacts 43g–43l, 44a–44f and 44g–44l, while furthermore, contact 43f of the first set is connected to contact 44g of the second set and contact 44f of the second set is connected to contact 43g of the first set, all as shown in the drawing.

The first contacts of each set of the reversing switch, that is, contacts 43a and 44a are furthermore connected to the switch arms 18 and 42 of the multiplier and balancing resistors, while the switch arms 45 and 46 are connected to the grids of the balancing tubes 11 and 12, respectively. Switch arms 45 and 46 are operated in synchronism with switch arms 18 and 42 such as by direct connection to or mounting upon the shaft 50 of motor 32 as indicated at 47 and 48.

As shown more clearly in FIG. 5, the range and balancing resistor switches are provided with additional contacts to provide a full number, that is, twelve contacts in the example shown equal to and arranged in the same manner as the contacts 43a–43l and 44a–44l of the polarity reversing switch, further means being provided, such as switch arms 18 and 42 engaging pairs of diametrically opposed contacts of the switches to cause, for instance, the contact connections to 20a and 41a to coincide with the contact connections to both 43a and 43g or 44a and 44g, respectively. In FIG. 5, the position of the switches shown corresponds to the highest range or scale, that is, scale 49f of FIG. 3.

As a result of the connections shown of the range selector and of the polarity reversing switches, the input from the multiplier 16a–16f in the second six positions of the switches 18 and 42 is applied to the grid of the tube 12 and the grid of tube 11 is connected to the arm 42 of the balancing resistor chain 40a–40f. This results in a polarity reversal, since a positive voltage applied to the grid of 11 causes the same deflection of the meter 10, as well as anode voltage conditions of the tubes, as an equal negative voltage applied to the grid at 12. This arrangement of automatic polarity reversal permits identical circuits from the anodes of tubes 11 and 12 and beyond the thyratrons 23 and 24 to be used for automatic selection of either positive or negative voltages. This result is accomplished by reason of the fact that a voltage applied in the negative or wrong sense has the same effect as a decrease below the lower indicating limit of the meter, thus initiating the operation of the range selector until reaching a balanced condition with the other halves of the polarity reversing contacts 43a–43l and 44a–44l, respectively.

The switches 18 and 42 which are ganged with the switch arms 45 and 46 may be in the form of single pole six position switches with two arms or wipers on each rotor diametrically opposite from each other, whereby the wiper arms of these switches engage each of its stator contacts twice during a 360° rotation, whereas the switches 45 and 46 are in the form of double pole switches having wiper arms which touch each of the stator arms only once during a 360° rotation, in a manner more clearly shown by FIG. 5. Thus, each multiplier contact 20a to 20f is connected to the grid of either tube 11 or tube 12 once during a 360° rotation.

In place of the motor 32 a stepping switch of known construction may be used for operating the range selector and polarity reversing switches. Such a stepping switch may comprise, in a known manner, a solenoid and a plunger cooperating therewith by energization by the battery or other power source 33 upon closing of the thyratron operated relay 30. By the provision of suitable means, such as a set of balls mounted in an inclined race, the linear motion of the plunger into the solenoid is converted into a rotary motion for advancing the arms 18, 42, 45 and 46 of the switch assembly from one to the next contact in a predetermined direction. Near the end of each solenoid stroke an interrupter 51 operated by a cam or the like serves to break the current to the solenoid, thus withdrawing the plunger by the action of a return spring which is part of the assembly. This action is repeated continuously and at a sufficiently high rate as long as power is applied to the solenoid leads. The relay 30 energizes the solenoid when either of the thyratrons 23 or 24 is fired in the same manner as in the case of the motor 32 shown in FIG. 2.

The motor 32 or solenoid stepping switch operates in a unidirectional fashion which enables the meter to be so designed as to automatically select a range where the pointer deflection is greater but not beyond full scale, than on any other range. This is accomplished as shown by the following example.

The six positions of the multiplier chain 16a to 16f are so chosen, for instance, as to overlap and to give full scale deflection for the voltage ranges 0–1.5, 0–5, 0–15, 0–50, 0–150 and 0–500. If, in the preferred arrangement, the direction of rotation of the stepping switch is chosen to drive the arm 18 in the direction of increasing values of full scale voltage, it will stop at a range where the deflection of the meter 10 would be less than full scale, but not less than ¼ scale, assuming a proper biasing of the thyratrons 23 and 24. Since the ranges have been so chosen as to have some degree of overlap, in that a voltage of say 1.4 volts would fulfill these conditions on either the 0–1.5 volt range or the 0–5 volt range, the direction of rotation is chosen so that the 0–1.5 volt range is reached first. The motor or stepping switch then stops, and the best range, that is, the range with the maximum scale deflection and sensitivity for the particular input voltage under test, is automatically selected.

The upper and lower limit conditions of the thyratron circuit are initially adjusted for a positive voltage applied to the grid of 11 through switch 18. If a negative voltage is applied to the probe, this would correspond to a deflection less than ¼ scale and would thus cause the lower limit thyratron 23 to conduct until an appropriate multiplier 16a to 16f has been automatically found but with the negative input now applied to the grid of tube 12. As shown in FIG. 5, this permits a knob 52 on the end of the stepping switch shaft 50 to be labeled "+" on one end and "—" on the other, thereby providing external indication of the polarity of a D.C. input signal.

According to an improved feature of the invention, there is provided an automatic disabling of the range selector synchronized with both the range selector and polarity reversing switches and serving for the purpose of automatically stopping the operation of the range selector when the upper point of the highest indicating scale has been reached, on the one hand, and for enabling reading of the lower range of the first scale, that is, the position below the lower scale limit for which the meter has been adjusted or ¼ full scale according to the above example.

This auxiliary disabling switch comprises a switch arm 55 cooperating with a set of six contacts 56a–56f arranged in substantially the same manner as contacts 16a–16f and 41a–41f, switch arm 55 being of the double-pole type similar to arms 18 and 42 and also mounted upon the motor shaft 50 as indicated at 57, FIG. 2. Contact 56a is connected to the junction between the grid bias resistors 25 and 26 of the upper limit control thyratron 23 and contact 56f is connected to the junction between grid bias resistors 27 and 28 of the lower limit thyratron 24, while the adjustable contact 55 is shown grounded or connected to the B— line of the circuit.

Switch 55 permits two additional features to be incorporated in the meter. In the 0–500 volt or highest position of the range selector switch, the arm of 55 connects to contact 56f, thus shorting out biasing resistor 28. This depresses the grid voltage of thyratron 24 sufficiently so that no amount of increased in plate voltage from the plate of tube 12, due to an input voltage to the probe in excess of 500 volts is sufficient to cause the upper limit thyratron to conduct. Thus, when a voltage in excess of 500 volts is applied to the probe, the range selector switch comes to rest on the 0–500 volt range and when the probe button is released, the meter deflects beyond full scale, apprising the operator that the upper limit range of the instrument has been reached or exceeded. In similar fashion when the arm of 55 makes contact with contact 56a shorting out resistor 26, the grid voltage of thyratron 23 is sufficiently depressed to prevent the thyratron from firing for any voltage greater than zero volts. In this fashion voltages lying in the first quarter of the first or lowest scale will be indicated on the 0–1.5 volt range, but on any other range, voltages which would lie within the first quarter would cause the lower limit thyratron to conduct, thereby actuating the motor or stepping switch.

In brief, the motor or stepping switch 32 operates in all conditions where the deflection of the meter would be (a) greater than full scale (except on the highest or 0–500 volt range) or exceed a predetermined upper scale limit and (b) less than ¼ scale (except on the lowest or 0–1.5 volt range).

In actual practice, the upper limit conduction point of thyratron 24 is set for somewhat less than full scale deflection, as described with reference to FIGS. 3 and 4, to allow for tube ageing and drift with line voltage changes, and the lower limit is set for somewhat less than ¼ scale for the same reason.

By adding a rectifier before the multiplier chain 16a to 16f, the same circuit arrangement can be used for automatically selecting ranges on A.C. input volts, but since the rectifier converts A.C. to a unidirectional D.C., the pointer will always indicate the scale in only one polarity for A.C. inputs. By providing a battery and series resistors instead of a multiplier chain, the same arrangement can be used as an automatic range selecting ohmmeter. By means of suitable switching arrangements, the unit is adaptable as a combination automatic A.C., D.C. volts and ohmmeter.

FIG. 6 shows, by way of example, an arrangement for use of the invention as a simple servomechanism or remote control device. Item 60 represents a control shaft and 61 a controlled shaft to be maintained by remoter control in synchronism with the rotational position of said control shaft by an automatic mechanism constructed in accordance with the invention. To this end, the control shaft 60 has coupled therewith the rotating contact 63 of a potentiometer resistance 62 energized by a source of fixed potential, such as battery E. The output voltage E$i$ derived from the contact 63 which varies in proportion to the rotational position of the shaft 60 is applied to the incremental potentiometer 16 of a control system according to the invention, comprising further a balanced comparator and control circuit 64 and output motor 32, substantially as shown by FIG. 2, but with this difference that the cathodes of tubes 11 and 12 are connected permanently and the polarity reversing switches 45 and 46 and the limit switch 55 are omitted.

By choosing a sufficient number of contacts or incremental resistance values of the potentiometer 16, the angular position of the controlled shaft 61 is thus automatically adjusted to within desired limits of the rotational position of the control shaft 60, in a manner similar to and readily understood from the foregoing. A servomechanism or control device of this type has the advantage, among others, of great simplicity of construction and low cost on the one hand, and high operating stability, on the other hand, compared with conventional closed loop or inverse feedback type servo systems.

In the foregoing the invention has been described with reference to a specific illustrative device. It will be evident, however, that numerous variations and modifications, as well as the substitution of equivalent parts or elements for those shown may be made without departing from the scope and spirit of the invention as set forth in the appended claims. The specification and drawings are accordingly to be regarded in an illustrative rather than a limiting sense.

I claim:

1. A multi-range electrical indicating system comprising a first and a second amplifier tube each having a cathode, a control grid and an anode, a source of anode operating voltage connected in parallel relation to the anodes and cathodes of said tubes, biasing resistors connected to each of the cathodes of said tubes to provide normally equal cathode biasing potentials for said tubes, load resistors connected to each of the anodes of said tubes to provide a first anode output potential of said first tube normally balancing a second anode output potential of said second tube for zero input voltage between the grids and cathodes of said tubes, a multiple range current indicator connected between the cathodes of said tubes, input means for applying a varying grid input voltage to said first tube, to cause a current flow proportional to said input voltage through said indicator and effect an unbalance of said output potentials by decreasing said first output potential and increasing said second output potential, and vice versa, in proportion to an increase and decrease, respectively, of said input voltage, a ring-shaped range potentiometer operatively connected between said input means and the grid of said first tube, rotary contact means cooperating with said potentiometer to subdivide an applied input voltage in fixed progressive predetermined steps, a pair of biased relays each having an input and an output, coupling means between each of the inputs of said relays and one of the anodes of said tubes, to control said relays by said first and second output potentials, respectively, biasing means for each of said relays to energize and operate the same during the periods of the respective output potentials exceeding predetermined upper limit values, continuously operating unidirectional actuating means for said contact means arranged for control by either of said relays, to operate said contact means upon either of said output potentials exceeding its limit value, whereby to automatically adjust said potentiometer to a resistance range corresponding to said input voltage such that the adjusted position of said potentiometer will cause said indicator to indicate on the most accurate range.

2. A multi-range electrical indicating system comprising a first and a second amplifying device each having a first and a second main electrode and an input control electrode the potential of which relative to the first main electrode controls the current between said main electrodes, a source of operating voltage connected in parallel relation to the main electrodes of said devices, biasing resistors connected to each of the first main electrodes of said devices, to provide normally equal input biasing potentials of said devices, load resistors connected to each of the second main electrodes of said devices, to produce a first output potential at the second main electrode of said first device normally balancing a second output potential at the second main electrode of said second device for zero input voltage applied to the control electrode of both said devices, a multiple range current indicator connected between said first main electrodes of said devices, input means for applying a varying input voltage to the control electrode of said first device, whereby to cause a current flow proportional to said input voltage through said indicator and effect an unbalance by decreasing said first output potential while increasing said second output potential, and vice versa, in proportion to an increase and decrease, respectively, of said input voltage, a ring-shaped range potentiometer operatively connected between said input means and the control electrode of said first device, a rotary contact arm cooperating with said potentiometer to subdivide an applied input voltage in fixed progressive predetermined steps, a pair of biased relays each having an input and an output, coupling means connecting each of the inputs of said relays with one of the second output electrodes of said devices, to control said relays by said first and second output potentials, respectively, biasing means for each of said relays to cause either relay to be energized and operate during the periods of the respective output potentials exceeding predetermined upper limit values, and continuously operating unidirectional actuating means for said contact means arranged for control by either of said relays, to operate said contact means upon either of said output potentials exceeding its limit value, whereby to automatically adjust said potentiometer to a resistance range corresponding to said input voltage such that the adjusted position of said potentiometer will cause said indicator to indicate on the most accurate range.

3. In a multi-range electrical indicator as claimed in claim 2, including means synchronized with said rotary contact arm for disabling said relay biasing means upon increase of one of said output potentials beyond its upper limit within the highest resistance range and upon increase of the other output potential above its upper limit within the lowest resistance range, respectively, of said potentiometer means, to enable an indication from zero to the upper end of the highest operating range of said indicator.

4. In a multi-range electrical indicator as claimed in claim 2, including polarity reversing switch means synchronized with said rotary contact arm, to alternately apply said input voltage to the control electrodes of said first and second amplifying devices during successive revolutions of said rotary contact arm scanning said potentiometer means.

References Cited in the file of this patent

UNITED STATES PATENTS

| | | |
|---|---|---|
| 2,454,520 | Moore | Nov. 23, 1948 |
| 2,478,966 | Gilbert | Aug. 16, 1949 |
| 2,497,961 | Shaw | Feb. 21, 1950 |
| 2,534,801 | Siltamaki | Dec. 19, 1950 |
| 2,611,092 | Smullin | Sept. 16, 1952 |
| 2,643,344 | McLaren et al. | June 23, 1953 |
| 2,722,640 | Merrill et al. | Nov. 1, 1955 |
| 2,865,000 | Newell | Dec. 16, 1958 |